United States Patent Office 3,434,801
Patented Mar. 25, 1969

3,434,801
DIAGNOSTIC TEST MATERIAL FOR DETERMINATION OF OVULATORY FUNCTION AND METHOD FOR PRODUCTION OF SAID TEST MATERIAL
George H. Scherr, Park Forest, Ill., assignor to Colab Laboratories, Inc., Chicago Heights, Ill., a corporation of Illinois
No Drawing. Filed Feb. 21, 1964, Ser. No. 346,404
Int. Cl. G01n 31/22; C01g 37/14
U.S. Cl. 23—253                                13 Claims

ABSTRACT OF THE DISCLOSURE

Diagnostic test material for diagnosing ovulatory function by determining chloride ion concentration of female body liquid indicative of ovulatory function and selected from cervical, nasal, and salivary mucus, comprising bibulous sheet-form base and ionic chloride ion concentration-indicating compound of metal chromate or dichromate type dispersed therein together with excess cations corresponding to those of which the indicating compound is composed. Allows female body liquids having sodium chloride concentrations between about 0.1 and 0.5% to be readily distinguished from those having sodium chloride concentration between about 0.8 and 0.9%.

The present invention relates to the determination of ovulatory function, and is more particularly concerned with a novel test material for the precise determination of ovulatory function as reflected by chloride ion concentration changes exhibited by certain female body liquids.

The preparation of silver chromate impregnated sheets for the detection of chloride ions for purposes other than determination of ovulatory function has previously been reported. In the prior art preparations filter paper sheets have been dipped into a solution of 0.2 N silver nitrate, dried, and immersed in a 0.2 N solution of potassium chromate. The papers were then washed with distilled water to remove excess potassium chromate and stored for use either dried or wet. Papers thus prepared were designed to detect the possible presence of increased chloride ion in sweat which occurs in cases of cystic fibrosis of the pancreas. In this disease, the chloride ion concentration frequently reaches a level of 50 or more milliequivalents of chloride ion per liter of sweat, or approximately 0.3% based on sodium chloride.

Recently, a test procedure for ovulatory function, based upon the determination of chloride ion concentration of various female body liquids, especially cervical mucus, has been developed. In such test procedure for ovulatory function, it is necessary to clearly distinguish between reactions of 0.1%–0.5% sodium chloride and those of approximately .8%–.9% sodium chloride. Although there is a relationship between the concentration of sodium chloride and the intensity of the precipitant reaction of silver chloride in a silver chromate impregnated filter paper sheet prepared as described, such a test sheet designed to be highly sensitive to a level of chloride ions of approximately 0.3% is not always sufficiently discriminatory at higher concentration levels, and particularly a level of 0.5%–0.85%, the level of criticality for the ovulatory function test. Thus, the reaction of .3% sodium chloride on a test sheet prepared for ovulatory function should give a weak reaction as contrasted to the strong reaction which is desirable for prior art chloride tests for other purposes.

It is accordingly desirable to have available a test material for testing ovulatory function which gives a weak reaction at chloride levels equivalent to approximately 0.1% to 0.5% sodium chloride, and a vividly contrasting strong reaction at or about 0.85% sodium chloride. The more contrasting the test reactions for low and high chloride ion concentrations of the ovulatory function test can be made, the less likelihood there will be of false reactions or incorrect interpretation of test results.

There is another significant difference in the biological test material used in the test for ovulatory function, whether it be cervical, nasal, or salivary mucus, in that these biological secretions contain significantly higher amounts of protein and muco-polysaccharide chemicals than are usually found in body liquids such as sweat. In other words, the test for ovulatory function requires a discriminatory reaction between concentrations of approximately 0.1%–0.5% sodium chloride and 0.8%–0.9% sodium chloride in a fluid containing significant concentrations of high molecular weight products of biological origin, whereas tests of materials such as sweat are not similarly complicated.

Another desirable feature of a chloride test material to be used for ovulatory function is the retention of the contrasting reactions between the low and high concentration of chloride for extended periods of time after the test has been performed. Thus, readings of chloride reactions of the ovulatory test which may be made over a period of a month may have the relative intensities of the low and high reactions depreciated by the well-known phenomenon that silver salts tend to darken with age, especially when exposed to light. Such darkening in tests for chlorides performed for cystic fibrosis of the pancreas may not be of serious consequence since they are qualitative tests designed to detect the presence or absence of chlorides above a certain critical level and, a reaction having occurred or one failing to have occurred, would not be altered in a qualitative sense by such darkening that might occur. However, in the test for ovulatory function, two reactions which may be of sharp contrast at the time the test is performed would diminish in this contrasting characteristic if both began to darken with time.

It is accordingly an object of the present invention to provide a material for testing ovulatory function by determining the chloride ion concentration of certain body liquids, the chloride ion concentration of which is indicative of the various phases of the ovulatory function. It is another object to provide such a test material which gives a highly discriminatory visual reaction with chloride ion concentrations of a magnitude indicative of the ovulation period or ovulatory abnormalities. It is an additional object to provide a test material which gives such a highly discernible indication of the critical values of chloride concentration even in the presence of proteinaceous and other material present in the body liquid. It is a further object to provide a method for the production of test materials of the type described. It is an additional object to provide a method for determining ovulatory function utilizing the novel test materials of the invention. Additional objects will be apparent to one skilled in the art and still others will become apparent hereinafter.

According to the invention, a diagnostic test material is provided for determining ovulatory function by measuring the chloride ion concentration of a female body liquid the chloride ion concentration of which is related to ovulatory function by incorporating, as by impregnating in a base sheet, an ionic chloride ion test compound together with another compound providing excess cations of the same metal as present in the cation of the indicating compound. The presence of the excess cations greatly enhances the discernibility of the visual test indication in the particular range which is critical with respect to determination of the ovulation period, and additionally enables the test to be carried out with great precision even in the presence of proteinaceous and other substances which may be contained in the female body liquid subjected to the test.

Throughout the specification and claims, wherever a value is given for chloride ion concentration, the value is to be considered in reference to sodium chloride. Also, whenever the term "body liquid" is used herein, it is to be understood that the term includes any body secretion or excretion.

The test material of the invention comprises a base material having the indicating compound dispersed and preferably impregnated therein. The base material should be a bibulous material such as filter paper, other absorbent papers or woven or non-woven cellulosic sheets or absorbent fabrics, so that the indicating compound may be readily incorporated therein as by impregnation.

The preferred ionic indicating compound is silver chromate. However, other chloride ion-indicating compounds may be used. For example, compounds wherein the anion is dichromate may be used. Additionally, silver salts may be replaced by other suitable cation salts such as that of mercurous nitrate.

The silver ion may be provided by compounds such as silver nitrate, silver acetate, silver chlorate, etc. The chromate ion may be provided by compounds such as sodium chromate, potassium chromate, etc. Dichromates such as sodium dichromate and potassium dichromate may also be used. In some methods of incorporation, as in a beater stage of the paper-making process, a pre-formed silver chromate or dichromte may be incorporated directly. Alternatively, a compound having a different cation, such as mercurous chromate, may be used as an indicating compound, and may be formed by reacting mercurous nitrate with a chromate.

The indicating compound may be incorporated in the base material by any of several different methods. In one method the base material is first impregnated with a solution of a salt containing one of the desired ions, as for example either silver ion or chromate ion. The treated base material may then be dried and subsequently treated with a solution containing the other required ion. In the preferred method, the base material is treated first with the silver ion-containing solution, and subsequently with the chromate ion-containing solution. When the second solution is introduced, the indicating compound, as for example silver chromate, is precipitated within the base material.

In another method, the indicating compound may be incorporated in the paper-making process during a beater stage. In utilizing this method, the silver chromate may be formed separately and then incorporated with the paper in the pulp slurry in the beater in the pre-synthesized form. Alternatively, separate solutions containing the ions, as for example silver nitrate and potassium chromate, may be added to the beater and the precipitate formed in situ in the beater.

In order to be particularly sensitive to and visually discerning of differing chloride ion concentrations in the critical range of the ovulatory function test, the test material should contain the cation of the indicating compound in excess of that required for stoichiometric proportion with the selected anion of the chosen indicating compound. Such excess may be conveniently incorporated during the synthesis of the indicating compound by treating the base material with the desired cation-containing solution of a higher Normality than that of the desired anion-containing solution. For example, in the preferred method, the base material, such as a filter paper sheet, may be first dipped into a solution of 0.275 N silver nitrate, dried, and subsequently dipped into a solution of 0.175 N potassium chromate. In another procedure, solutions of equal Normality may be utilized, with special precautions taken to ensure that a greater volume of silver nitrate is applied to the base sheet than potassium chromate. This may be accomplished by utilizing a longer dwell period within the silver nitrate solution than within the potassium chromate solution. Alternatively, a smaller metered volume of potassium chromate may be applied after treating the base material with an excess of silver nitrate solution. When the indicating compound is incorporated during a beater stage of the paper-making process, pre-formed silver chromate may be added to the beater together with a sufficient amount of silver nitrate to provide the required excess of silver ions. Alternatively, silver nitrate and potassium chromate solutions may be added to the beater, with the silver nitrate solution having a higher Normality or in greater volume than the potassium chromate solution. As a further procedure, the indicator compound such as silver chromate may be added together with silver nitrate as dry ingredients to the pulp in the beater, thus introducing a greater equivalency of silver salt.

The test materials of the invention are preferably prepared by the use of a dipping operation in which a sheet of absorbent material is dipped into a suitable solution of silver nitrate. The excess is drained off by placing the sheet on a roll of paper toweling. The sheet which has been thus impregnated is dipped into a solution of a suitable concentration of potassium chromate, forming silver chromate in situ, then washed, and dried. It has been discovered that the most discernible spot reactions distinguishing solutions of .5% and .85% sodium chloride concentration are obtained when the Normality of the silver nitrate solution is greater than that of the chromate solution. Thus, it has been found that the Normality of the silver nitrate solution may extend from .225 to .55 N and be reacted with solutions of potassium chromate in concentrations ranging from .175 to .2 N, and that utilization of test materials so provided results in readily visually discernible contrasting spots when swabs are impressed thereon containing .5 and .85% sodium chloride solutions, respectively. Any concentration in the range of .25 to .35 N silver nitrate when reacted with .225 N potassium chromate will also permit a suitable discerning reaction with .5 and .85% solutions of sodium chloride. It has also been found that any one of a range of concentrations of silver nitrate from .275 to .35 N when reacted with .25 N potassium chromate will permit a suitable discerning reaction with .5 and .85% solutions of sodium chloride.

The present test materials have been found to exhibit the following desirable properties:

(1) They result in a highly contrasting reaction utilizing female cervical, nasal, or salivary secretions containing between 0.1% and 0.5% sodium chloride and those secretions containing approximately .8% to .9% sodium chloride.

(2) They do not suffer deterioration of the silver chloride precipitate that would interfere with the distinguishing intensities between the reactions of the lower and higher chloride concentrations during the period of usage of the test paper and under the conditions of storage that such test paper would oridinarily encounter.

(3) They are relatively unaffected by the presence of proteinaceous matter and muco-polysaccharide chemicals in the female body liquids tested.

The following examples are given by way of illustration only and are not to be construed as limiting.

EXAMPLE 1

Filter paper sheets of 11 cm. diameter, manufactured by the Whatman Filter Paper Company and designated as Grade No. 1, are dipped into a solution of 0.175 N potassium chromate ($K_2CrO_4$), permitted to drain on a clean piece of paper towelling and, while still wet, plunged into a solution of 0.275 N silver nitrate ($AgNO_3$). The test sheets are then dried in a hot-air oven at about 107° C. for approximately ten to fifteen minutes, after which they are ready for use.

EXAMPLE 2

Filter paper sheets of 11 cm. diameter, manufactured by the Whatman Filter Paper Company and designated as Grade No. 1, are dipped into a solution of 0.35 N $AgNO_3$, permitted to drain on a clean piece of paper towelling, and then plunged into a solution, while still wet, of 0.25 N $K_2CrO_4$. The test sheets are then dried as in Example 1.

EXAMPLE 3

Filter paper sheets of the same type used in Example 2 are dipped into a solution of 0.35 N mercurous nitrate, permitted to drain and, while still wet, dipped into a solution of 0.25 N potassium chromate. The sheets are then dried as in Example 1.

EXAMPLE 4

Filter paper sheets of the type used in Example 2 are dipped into a solution of 0.35 N $AgNO_3$, permitted to drain and, while still wet, dipped into a solution of 0.25 N potassium dichromate. The sheets are then dried as in Example 1.

EXAMPLE 5

To determine the optimum proportions that would give a weak reaction with concentrations of sodium chloride less than about 0.8% and a bright peak reaction at concentrations of approximately 0.85% or slightly higher (up to about 0.9%), indicator papers utilizing varying concentrations of silver nitrate and potassium chromate have been studied. Filter paper sheets are accordingly prepared and treated as in Example 2 above, in which solutions of silver nitrate at concentrations of .175, .2, .225 and .25 Normality are reacted with solutions of potassium chromate of the same Normality series (.175, .2, .225 and .25) in all possible combinations. All of the above proportions tested show a visibly discernible brighter silver chloride precipitate at concentrations of 0.8 to 0.9% concentrations of sodium chloride or greater than at concentrations of 0.4 and 0.5% or less sodium chloride and therefore are amendable to use in this test. However, certain proportions result in a more vivid difference in intensity of silver chloride precipitate between the lower concentrations of sodium chloride and the physiological (ca. 0.85%) salt concentrations examined. The compositions providing these superior results are as follows:

NORMALITY OF SOLUTIONS

| Silver nitrate | Potassium chromate | Excess silver nitrate |
|---|---|---|
| .225 | .175 | .050 |
| .225 | .2 | .025 |
| .25 | .175 | .075 |
| .275 | .25 | .025 |
| .275 | .175 | .1 |

In the foregoing table, the minimum excess of $AgNO_3$ over the $Ag_2CrO_4$ formed is 12.8% (at .025 N excess), and the maximum excess of $AgNO_3$ over the $Ag_2CrO_4$ formed is 58.5% (at .1 N excess).

All of the foregoing test materials are suitable for accomplishing the objectives of the present invention.

In performing the test for ovulatory function for which the test material of the invention is designed, a smear of cervical mucus is taken directly from the cervical canal with a swab such as a cotton or calcium alginate swab, and rubbed on the test paper. Alginate, e.g., calcium alginate, swabs are definitely superior to cotton swabs for this purpose, i.e., the performance of the test, all other factors being equal. For reasons which are not fully understood, the resultant spot on the test paper using an alginate swab appears clearer or smoother and gives enhanced contrast for easier interpretation of the test.

If the patient is taking smears daily during the intermenstruum, it is desirable to use a swab-tipped plunger encased in a cylinder of cardboard or plastic. The cylinder is introduced well up into the vagina, the plunger is pushed up to the cervix for the specimen of mucus and then again withdrawn into the cylinder before the whole device is removed. This has the advantage of not contaminating the swab with mucus or other substances which may be present in and around the vaginal orifice. After removal, the plunger is pushed upward again to expose the swab tip, which is then rubbed gently over an area of about two centimeters or the treated test paper. The patient takes smears every day or every few days of her cycle from the end of one menses to the beginning of the next. Thus, estrogenic activity followed by progestational activity is noted according to the changes observed on the paper.

Chloride ions of the smear react with silver ions of the silver chromate precipitate, displacing the chromate ions and resulting in a white silver chloride precipitate. The white silver chloride precipitate is in sharp color contrast to the reddish-brown background of silver chromate. The magnitude of the silver chloride precipitate, and hence the intensity of the white precipitate that results, is in proportion to the amount of chloride ion present in the specimen rubbed or streaked onto the test paper. Thus, by dipping a swab stick into a graded series of concentrations of sodium chloride and by comparing the intensities of the silver chloride precipitates formed with a cervical mucus specimen, it is possible to semi-quantitatively relate chloride ion concentration of a specimen of cervical mucus taken at any stage of the ovulatory cycle against a standard series.

It is to be understood that the invention is not to be limited to the exact details of operation or exact compounds, compositions, or materials shown and described, as obvious modifications and equivalents will be apparent to one skilled in the art, and the invention is therefore to be limited only by the scope of the appended claims.

I claim:

1. A diagnostic test material suitable for diagnosing ovulatory function by determining the chloride ion concentration of a female body liquid indicative of said function and selected from the group consisting of cervical, nasal, and salivary mucus, comprising a bibulous sheet-form base and an ionic chloride ion concentration-indicating compound selected from the group consisting of metal chromates and dichromates dispersed therein together with an excess of cations, corresponding to those of which said indicating compound is composed, whereby, when placed in contact therewith, said female body liquids having sodium chloride concentrations in the range of about 0.1% to 0.5% may be readily distinguished from those having sodium chloride concentrations in the range of about 0.8% to 0.9%, the excess of cations being at least 12.8% based upon the indicating compound present.

2. A diagnostic test material according to claim 1, wherein said chloride ion concentration-indicating compound is silver chromate, and said material contains a soluble silver salt therein to provide the excess silver ions.

3. A diagnostic test material according to claim 1, wherein said chloride ion concentration-indicating compound is silver dichromate, and said material contains a soluble silver salt therein to provide the excess silver ions.

4. A diagnostic test material according to claim 1, wherein said chloride ion concentration-indicating compound is silver chromate, and said material contains silver nitrate to provide the excess silver ions, and wherein said cation is present in an amount which does not exceed 58.5% based on the silver chromate present.

5. A diagnostic test material according to claim 1, wherein said base is selected from the group consisting of paper and fabric.

6. A method for the production of a diagnostic test material suitable for diagnosing ovulatory function by determining the chloride ion concentration of a body liquid indicative of said function and selected from the group consisting of cervical, nasal, and salivary mucus, comprising incorporating an ionic chloride ion concentration-indicating compound selected from the group consisting of metal chromates and dichromates together with excess cations, corresponding to those of which said indicating compound is composed, in a sheet-form base, and drying said test material, the excess of cations being at least 12.8% based upon the indicating compound present.

7. A method according to claim 6, wherein said chloride ion concentration-indicating compound is silver chromate and said excess cations are provided by the addition of silver nitrate, and wherein said cation is present in an amount which does not exceed 58.5% based on the silver chromate present.

8. A method for the production of a diagnostic test material suitable for diagnosing ovulatory function by determining the chloride ion concentration of a body liquid indicative of said function and selected from the group consisting of cervical, nasal, and salivary mucus, which comprises treating a bibulous sheet-form base consecutively with an aqueous silver ion-containing solution and an aqueous chromate ion-containing solution, in either order, wherein said silver ion-containing solution has a higher Normality than said chromate ion-containing solution to provide an excess of silver ions over that equivalent amount required for reaction with the chromate ions in said bibulous sheetform base, and drying said test material, the difference in normalities being at least .025.

9. A method according to claim 8, wherein the concentration of said silver ion-containing solution is about .225 to .55 N and the concentration of said chromate ion-containing solution is about .175 to 0.25 N, with the proviso that the Normality of the silver ion-containing solution is the higher of the two.

10. A method according to claim 8, wherein said silver ion-containing solution comprises silver nitrate and said chromate ion-containing solution comprises potassium chromate.

11. A method for the production of a diagnostic test material suitable for diagnosing ovulatory function by determining the chloride ion concentration of a female body liquid indicative of said function and selected from the group consisting of cervical, nasal, and salivary mucus, which comprises incorporating an ionic chloride ion concentration-indicating compound selected from the group consisting of metal chromates and dichromates together with a material supplying cations, corresponding to those of which said indicating compound is composed, into a paper pulp slurry during a beater stage of the paper-making process, and forming paper indicator sheets from said so-treated slurry, the material supplying cations providing an excess of at least 12.8% based upon the indicating compound present.

12. A method according to claim 11, wherein the chloride concentration-indicating compound is a silver salt and the added cations supplied are silver cations.

13. A method according to claim 11, wherein the chloride concentration-indicating compound is silver chromate and the material supplying cations is a soluble silver salt and wherein said cation is present in an amount which does not exceed 58.5% based on the silver chromate present.

References Cited

UNITED STATES PATENTS

| | | | |
|---|---|---|---|
| 2,676,874 | 4/1954 | Devine | 23—230 |
| 3,021,257 | 2/1962 | Stauffenberg | 162—181 |

OTHER REFERENCES

Frank, H. A.; Carr, M. H., J. Lab. and Clin. Med., February 1957, vol. 49, No. 2, pp. 246–252.

MORRIS O. WOLK, *Primary Examiner.*

R. M. REESE, *Assistant Examiner.*

U.S. Cl. X.R.

167—74; 252—408